UNITED STATES PATENT OFFICE 2,593,640

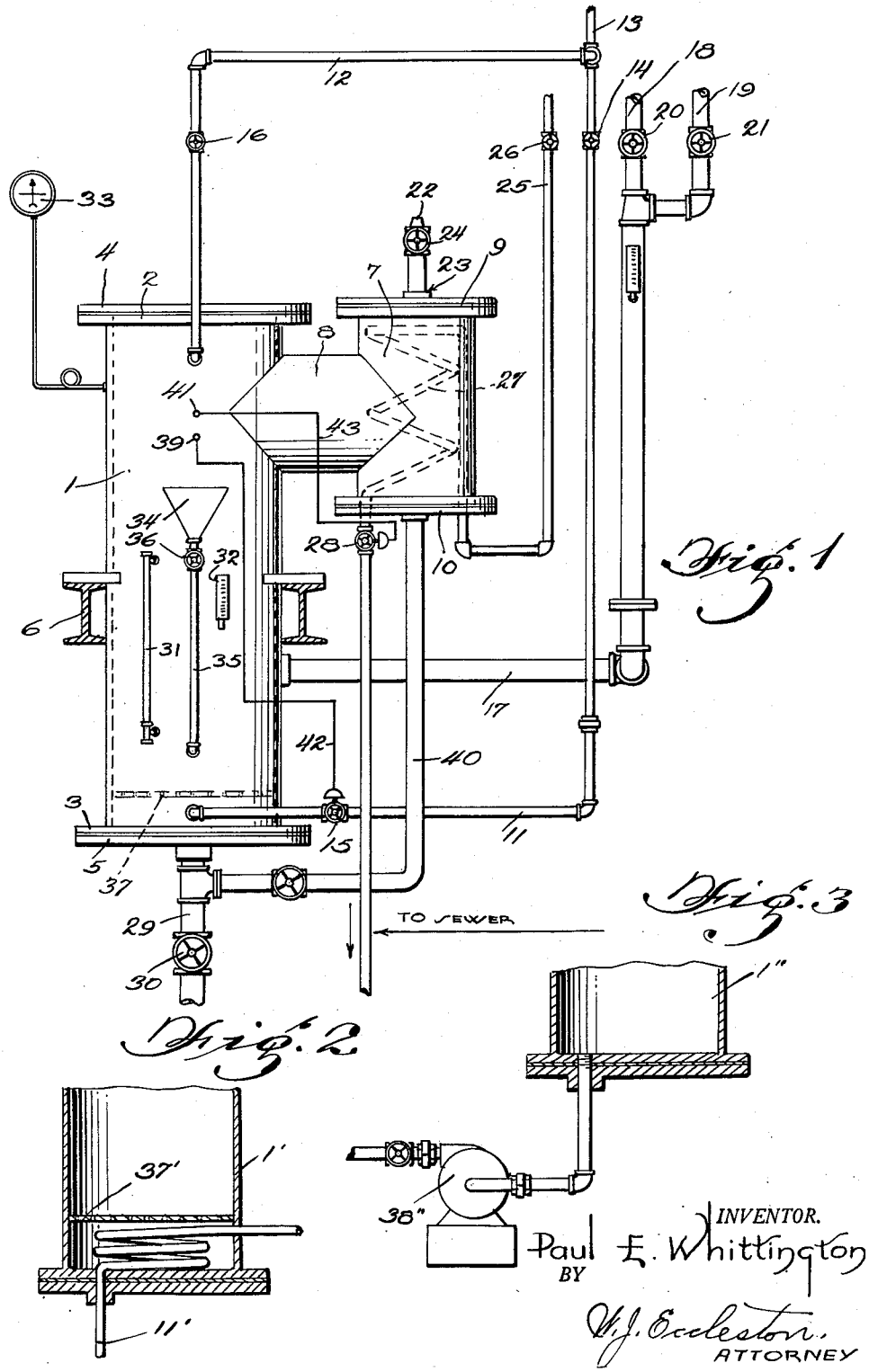

APPARATUS FOR FLUID TREATMENT OF TEXTILES AND CLOTHING

Paul E. Whittington, Arlington, Va.

Application October 8, 1946, Serial No. 701,858

4 Claims. (Cl. 68—15)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to a method of and apparatus for treatment of textiles, clothing products, plastic materials, and the like, and more particularly, to a method of and apparatus for washing or otherwise treating such products under a partial vacuum and with controlled temperatures.

Heretofore methods of and apparatus for liquid treatment of clothing, textiles, and plastic materials have invariably been accompanied by undue wear of the products due to the accompanying mechanical agitation or to inadequately controlled temperatures for the treatment. It is therefore a major object of this invention to provide an improved method of and apparatus for liquid treatment of textiles, clothing products, or plastic materials in which the products are subjected to gentle agitation and heat is simultaneously applied to and withdrawn from the system at a balanced rate so as to maintain the temperature of the product within predetermined limits.

It is another object of this invention to provide an improved method of and apparatus for treatment of a liquid in which heat is added to and simultaneously removed from the system, and in which either the application of heat or the withdrawal of heat is applied intermittently so as to maintain the temperature of the liquid within predetermined limits.

Still another object of this invention is to provide a method of and apparatus for treatment of a liquid as for laundering, bleaching, dissolution of products, and the like, in which heat is withdrawn from the system and heat is simultaneously applied to the liquid at a rate greater than the rate at which heat is withdrawn and in which the application of heat is stopped intermittently to maintain the temperature of the liquid within predetermined limits.

A further object of this invention is to provide an improved method of and apparatus for treating a liquid in which heat is simultaneously added to and withdrawn from the system, the rate of withdrawal of heat being greater than the rate at which heat is applied and in which the withdrawal of heat is stopped intermittently to maintain the temperature of the liquid within predetermined limits.

It is still another object of this invention to provide an improved method of and apparatus for treating textiles or clothing products providing for immersing the products in a liquid, boiling said liquid under a partial vacuum, and adding heat to maintain the boiling and simultaneously withdrawing heat to maintain the partial vacuum and thereby keep the temperature of the liquid within prescribed limits.

Still a further object of this invention is to provide a method of and apparatus for treating textiles and the like by immersing the textiles in a liquid, boiling said liquid under a partial vacuum, adding heat to continue the boiling, and condensing the vapors rising from the liquid to maintain the partial vacuum, the rate of application of heat and the rate of condensation being balanced to maintain the temperature of the textiles within predetermined limits.

Still another object of this invention is to provide a method of and apparatus for treating textiles, products, and the like, providing for immersing the products in a liquid in a container, boiling said liquid, condensing the vapors rising from said liquid to withdraw heat, applying additional heat to the liquid to maintain boiling, and returning condensed liquid to the container to maintain the liquid supply.

It is still a further object of this invention to provide an improved apparatus for treating liquids including a container and providing means for filling the container with the liquid, sealing the container, and creating a vacuum over the liquid by evacuating part of the liquid from the container while sealed.

It is furthermore an object of this invention to provide for a method of treating liquids in a container involving boiling said liquid under a vacuum, and in which the vacuum is originally created by partially filling the container with the liquid and forcing steam into the top of the container to drive out the air over the liquid.

It is also an object of this invention to provide an improved apparatus for treating textiles, plastic materials, or clothing products including a container for receiving the materials or products, and means for heating and cooling the materials or products, and wherein each of the heating and cooling means is provided with a thermostatic control so that either of said means may be operated intermittently, depending on whether the rate of application of heat or rate of cooling is greater.

Other objects and advantages of the present invention will appear in the following detailed description and particularly will be pointed out in the appended claims, reference being had to the accompanying drawing forming a part of the specification and in which:

Figure 1 is a front elevational view of the apparatus embodying this invention;

Figure 2 is a fragmentary sectional detail of the bottom of a modified form of tank in the apparatus of this invention;

Figure 3 is a fragmentary sectional detail view of either of the tanks shown in Figures 1 and 2, and modified to provide for a suction means at the bottom of the tank.

Referring to the drawing, Figure 1, reference numeral 1 refers to the tank for receiving the textiles, plastic materials, clothing products, or the like, to be treated, the tank 1 being of any suitable construction and as illustrated may comprise a section of seamless steel tubing flanged outwardly at the top, as at 2, and at the bottom, as at 3. A removable lid 4 fits onto flange 2 and closes off the opening through which items to be treated may be inserted. The bottom 5 of the tank is suitably secured to the flange 3. The tank 1 may be of substantial height and may extend to a height greater than ceiling height and in such case, the tank 1 may pass through the floor of the building, being supported by I-beams 6 at the approximate center of the tank. However, it is also within the scope of this invention to construct the tank sufficiently small so as to be housed in one room.

A condensing chamber 7 is provided communicating with the top of tank 1 by means of the tubing or passageway 8. The condensing chamber 7 is likewise preferably constructed of seamless tubing with its ends suitably flanged and closed off, as at 9 and 10. Steam is supplied to the tank 1 at the bottom by means of a steam supply line 11 and at the top of the tank 1 by means of the steam supply line 12, the two lines 11 and 12 being fed from the main steam supply line 13. The steam line 11 is provided with a shutoff valve 14 and a thermostatic valve 15 to control the steam input to the bottom of tank 1. The steam supply line 12 is provided with a shutoff valve 16 to control the steam supply to the top of tank 1. To supply water at a suitable temperature to the tank 1, there is provided a water supply pipe 17 connected to the side of tank 1, as illustrated, the water supply 17 receiving hot water from the supply pipe 18 and cold water from the supply pipe 19, the hot and cold water supplies being controlled by the control valves 20 and 21, respectively. To permit the escape of air from the tank 1 and condensing chamber 7 communicating therewith, there is provided an air vent 22 connected to the condensing chamber 7, as at 23, and controlled by a shutoff valve 24. To provide for a cold water supply for the condensing chamber 7, there is provided a cold water supply pipe 25, controlled by a shutoff valve 26, and being coiled within the condensing chamber 7, as at 27, and leading from the bottom of the condensing chamber 7 for connection to a suitable waste system. The pipe 25 is furthermore provided with a thermostatically controlled valve 28, as illustrated, at a point adjacent to the exit of pipe 25 from the condensing chamber 7. To provide for draining the liquid from the tank at the conclusion of a treatment, there is provided a waste drain pipe 29 connected to the bottom of the tank 1 and being controlled by shutoff valve 30. The reference numeral 31 indicates a liquid level gauge to determine the quantity of liquid in the tank 1, and to determine the temperature of the liquid in the tank 1, there is provided a suitable thermometer 32 located on the side of the tank. Also to enable the determination of the absolute pressure in the tank over the liquid, there is provided a suitable pressure gauge 33 connected to the top of tank 1 for reading the absolute pressure so that the extent of the vacuum in the tank will be known.

In order to apply chemicals to the liquid in the tank 1, in accordance with the type of treatment desired, as for example, for adding washing, bluing, or bleaching chemicals, or the like, in the form of a solution or colloidal suspension, there is provided a funnel 34 at the side of the tank having a pipe 35 leading into the tank and controlled by a shutoff valve 36. Thus, any type of chemical in the form of a solution or colloidal suspension such as a soap mixture, a detergent, a rinse mixture, a sour mixture, a bluing mixture, or a bleaching mixture, or the like, may be admitted into the tank by means of the funnel 34 and pipe 35, the quantities and rate of admission being controlled by the valve 36. The bottom of the tank 1 is provided with a foraminous false bottom 37 for supporting the textiles, clothing products, or the like, and to permit withdrawal of the liquid through waste pipe 29 at the conclusion of the specific treatment.

In the embodiment shown in Figure 1, the steam pipe 11 extends into the bottom of the tank 1 for admitting steam directly into the liquid therein, the steam being adapted to rise up through the liquid. This admission of steam as described hereinafter is such as to maintain the liquid at a boiling temperature and thereby produce a gentle agitation thereof and the products being treated. However, in the embodiment shown in Figure 2, the steam pipe 11' is formed into a coil within the bottom of the tank 1' beneath the false bottom 37'. Thus, in this embodiment the steam does not enter the liquid but merely heats the liquid to produce boiling. In all other respects the apparatus of Figure 2 is the same as the apparatus of Figure 1.

In Figure 3, there is shown a further embodiment in which a water pump 38'' is connected to the bottom of the tank 1'' so that liquid may be withdrawn from the tank when sealed to produce a partial vacuum, as described hereinafter. In all other respects the apparatus of Figure 3 is the same as the apparatus of either Figure 1 or Figure 2.

A thermostat 39 extending into the tank is provided in all of the embodiments and as illustrated in Figure 1, for controlling the thermostatic valve 15 by the wiring 42 in accordance with the temperature within the tank. Though thermostat 39 is illustrated as being positioned near the top of the tank so as to be controlled by the temperature of the vacuum space above the liquid, as described hereinafter, the thermostat 39 may also be positioned near the bottom of the tank to be controlled by the temperature of the liquid in the tank. In actual operation, the temperature of the liquid in the tank and the temperature of the vacuum space thereover will tend to be about the same temperature so that valve 15 can be controlled from either. Similarly, the thermostat 41 is provided in all of the embodiments to control valve 28 by the wiring 43 in accordance with the temperature in the vacuum space.

In operation, the lid 4 is removed and the textiles, clothing products, or the like, as for example, soiled clothing may be placed in the tank 1. Then, after the lid 4 is tightly secured in position, water is admitted through the pipe 17, the quantity and temperature being controlled by the valves 20 and 21, and said quantity being indicated by the liquid gauge 31. This water may be admitted at any one of several selected temperatures, as for example, 140° F. Then a partial vacuum is created at the top of tank 1 over the liquid. This vacuum may be created by admitting steam through pipe 12, controlled by valve 16, while the air over the liquid is purged through air vent 22, controlled by valve 24, and when the air has been purged, the valves 16 and 24 may be closed to hold the vacuum at the top of the tank. However, if desired, the vacuum may be obtained in the following manner when utilizing the apparatus of Figure 3. The whole tank 1" may be filled first with water from pipe 17. Then by closing all of the valves, the water pump 38" may be operated to withdraw some of the liquid from the tank 1". This will create a partial vacuum over the liquid in the tank. If desired, steam may be admitted simultaneously by means of pipe 12 during the pumping operation to fill the vacuum space over the liquid with steam. After the vacuum is secured as above, the treating chemicals, as for example, a detergent in a liquid form is placed in the funnel 34 and valve 36 is partially opened. Gravity and the partial vacuum created in the tank will draw this chemical liquid into the water in the tank through pipe 35. The chemical solution may be other than a detergent, as for example, it may be any one of the following: rinse, sour, bluing, or bleaching chemicals.

Then the steam is admitted through pipe 11 or 11', as the case may be. In the case of Figure 1, this steam will rise up through the liquid, heating same, and produce agitation and boiling. In the case of apparatus of Figure 2, the heat from the steam coil under the false bottom 37' will heat the liquid and cause boiling, with rising steam, and agitation thereof. The steam from pipe 11, 11' will be admitted continuously until the temperature of the liquid reaches a predetermined point at which time thermostatically controlled valve 15 will shut off the steam supply through control of the thermostat 39. Thus, when the temperature in the tank reaches too high a point, the steam supply 11 or 11' is automatically shut off. Similarly, when the temperature in the tank reaches a predetermined low point, the thermostat 39 will cause the valve 15 to open so that additional steam may be added to heat the contents of the tank. If desired, the thermostat 39 may be located near the bottom of the tank in the liquid region instead of near the top of the tank in the vacuum region as illustrated in Figure 1.

While the steam is admitted through the pipes 11, 11', as outlined in the previous paragraph, cold water is allowed to flow through pipe 25 by opening valve 26 and thus simultaneously with the admission of steam to the bottom of the tank for heating purposes, cold water passes through pipe 25 and coil 27 of the condensing chamber 7, so that the steam and vapors rising to the top of the tank 1 in the vacuum space over the liquid will pass through passageway 8 and into condensing chamber 7 and be condensed therein. In order to maintain the supply of liquid in the tank 1, a return pipe 40 connects the bottom of the condensing chamber 7 with the waste pipe 29, as illustrated, and thus the condensed liquid will trickle into the pipe 40 and back into the tank 1. It is evident that the condensing chamber 7, in its operation of condensing the steam or vapor will prevent the reduced pressure area above the upper liquid level in tank 1 from being filled with steam or vapor which would result in the destruction of the vacuum and in the raising of the boiling point of the liquid in tank 1 to a point approximating the boiling point at atmospheric pressure (e. g., 212° F. in the case of water). Thus, the condensation of the steam or vapor in condensing chamber 7 maintains the boiling point of the liquid in the tank 1 at the desired low temperature, say 140° F., which is much less injurious to fabrics than a temperature of the order of 212° F. In order to maintain the temperature within the tank within predetermined limits, when the temperature reaches too low a point, the thermostat 41 will control the valve 28 to shut off the cold water supply, and thereby stop the cooling action or withdrawal of heat from the steam or vapor, thus stopping the condensation. On the other hand when the temperature within the tank reaches too high a point, the thermostat 41 will open the valve 28 to restart the flow of cold water and the condensing action to recommence the withdrawal of heat from the system.

In actual operation, the admission of heat by the steam through pipe 11 or 11' is controlled with relation to the condensing action in the condensing chamber so that the heat added by the steam is counterbalanced by the heat withdrawn in the condensing chamber. This is an ideal situation and is not usually obtainable in actual practice due to the variations in cold water temperature and other various factors, especially as the seasons change from winter to summer and vice versa. However, the setting of the thermostats 39 and 41, the extent of the vacuum created originally, the temperature of the water added initially, the temperature and rate of flow of the steam added through pipe 11, 11', and the temperature and rate of flow of the cold water in pipe 25 are all controlled so as to approach as nearly as possible the balanced condition outlined, that is, making the heat added to the tank by means of the steam substantially equal to the heat withdrawn from the system in the chamber 7. This balancing of heat input against heat output will maintain the partial vacuum above the liquid in tank 1, thus keeping the boiling point of the liquid low and the temperature of the contents of the tank 1 substantially constant or within very narrow limits. Though in actual operation either the heat input or the heat output will vary, the temperatures within the tank 1 can be controlled within predetermined limits by the apparatus, and as described hereinafter. For example, if the heat input is greater than the heat output as will be usual in the summer season, the operation is such that the steam supply will be operated intermittently while the cold water supply through pipe 25 will run continuously. On the other hand if the heat is withdrawn faster than the heat is supplied as will be usual in the winter season, the cold water supply will run intermittently while the steam supply through pipe 11 or 11' will be continuous.

More specifically, assuming that when the apparatus is started the initial temperature of the liquid is 140° F. and both the steam supply 11, 11' and cold water supply 25 are opened as described above so that heat is added and withdrawn from the tank 1 simultaneously. Now if the rate of heat application is too great, the temperature of the tank 1 and the contents will increase until it reaches a predetermined temperature, for example, 150° F. This will close valve 15, through thermostat 39, thus stopping the heat input. In the meantime, the cold water supply continues, heat is withdrawn from the system, and the tank will gradually cool. Then when the temperature drops to a low temperature, for example, 130° F. the thermostat 39 will open valve 15 so that the steam suply again comes on to supply additional heat. Then the temperature will again rise to 150° F. and the cycle is repeated. It is to be noted that during this operation where heat input is faster, the valve 28 stays open so that the cold water supply is continuous.

On the other hand, assuming that when the process is started that the cold water in pipe 25 is admitted at such a rate and temperature that more heat is withdrawn from the tank by the condensing action than is added by the admission of steam. This will cause the temperature of the tank to drop from the initial 140° F. to a low temperature, for example 128° F. This will then cause thermostat 41 to close valve 28 to stop the cold water supply and to stop the condensing action and the heat withdrawal. During this time the steam enters continuously and the tank temperature will rise. Then when the temperature reaches, say 148° F., the thermostat 41 will reopen valve 28 so that the cold water supply again commences its condensing action. This will again lower the temperature to 128° F. and the cycle is repeated. It is to be noted that in this operation, when the cold water flow is excessive, the cold water flow is automatically cut off and opened while the steam supply is maintained continuously.

At the termination of the wash, rinse, or other treatment period, the valves 14 and 26 are closed to stop the steam and cold water supplies, and valve 24 is opened to break the partial vacuum, and dump valve 30 is opened to drain out the liquid.

Thus, it is evident that applicant has provided an apparatus and a process wherein textiles, clothing, plastics, and the like may be washed, rinsed, bleached, or subjected to other types of liquid or fluid treatments and wherein the items being treated are agitated gently by the boiling action and the fluid is maintained at a relatively low temperature, about 140° F., so as not to injure the products, and at which low temperature boiling of the liquid is insured due to the partial vacuum thereover. Thus, the products are treated and agitated without being subjected to too great a temperature. Also, the agitation is gentle being produced by the gentle rising of compressible steam bubbles through the material immersed in the water. At the same time, it is apparent that by the use of temperature controls, as described and illustrated, for both the steam supply and the cold water supply, a relationship is obtained whereby the heat input necessary to continue the boiling of the liquid is substantially counterbalanced by the heat withdrawal from the vapors above the upper liquid level, which results in the condensation of such vapors and maintenance of the partial vacuum, thus permitting the liquid to boil at a relatively low temperature. Also, due to the several factors outlined above where the cold water temperature varies from season to season and even from day to day during the same season, the apparatus and method described has been designed for great flexibility so that, depending on whether the heat input is too great or the heat output is too great, there will still be a temperature maintenance within predetermined limits and, as described, this is accomplished either by operating the steam input intermittently or operating the condensation action intermittently in a wholly automatic manner. This flexibiliy forms a very important feature of this invention and renders it applicable under varying conditions and for various types of liquid treatment.

Another use to which the apparatus of this invention may be put is to treat plastic materials in the form of products, or in the form of a powder or liquid. In the case of plastic products or powders, the apparatus will be used as described above, as for textiles or clothing. In the case of plastics in liquid form, the apparatus shown in Figure 2 is preferable. The plastic liquid is placed in the tank in any suitable manner and is heated by the steam in coil 11'. The vacuum and condensing actions and the temperature controls described above are utilized as above in treating the liquid plastic. All of the features of the apparatus are utilized except that the tempered water supply may not be required, the liquid plastic taking the place of the water. Additional chemicals may be applied to the liquid plastic through the funnel. As an example of a liquid plastic that may be treated is liquid rayon which may be treated to dissolve the cellulose products therein.

It is thus seen that the apparatus of this invention lends itself to the treatment of various types of products and chemicals, both in solid for or liquid form, where it is desired to include a boiling action under vacuum and to control the temperatures by counterbalancing the heat input against the heat output in an automatic manner.

Though one condensing chamber 7 is illustrated it is within the purview of this invention to provide for two or more condensing chambers to increase the condensing capacity, the condensing chambers extending from different sides of the tank. Also, if desired, the tank may be modified so as to be loaded through a side opening provided therein and covered by a lid.

While the invention has been described in more or less detail, it is not limited thereby, as changes may be made in the form, arrangement and construction of parts, and equivalents may be substituted, without departing from the spirit and scope of the invention as claimed, the forms hereinbefore described being merely preferred embodiments thereof.

I claim:

1. Apparatus for treating textiles and the like with a boiling liquid at a temperature below the normal boiling point of said liquid, comprising a closed tank for said textiles and liquid, a condensing chamber adjacent to and in communication with said tank for receiving vaporized fluid therefrom, means for returning condensed liquid from said chamber to said tank, means for passing a cooling fluid in heat exchange with said condensing chamber, means for supplying heat to said tank, and first and second thermostatic means in said tank each being responsive to a predetermined temperature below the normal boiling point of said liquid, said first and second thermostatic means being positioned out of the path of the returning condensed liquid, said first thermostatic means being operatively connected to said means for passing cooling fluid and said second thermostatic means being operatively connected to said means supplying heat to said tank, so as to operate said means for passing cooling fluid and said means for supplying heat to condense enough vapors in said condensing chamber and to restrict the amount of heat supplied to said tank, whereby to maintain a predetermined partial vacuum in said tank and to boil said liquid in said tank at said predetermined temperature below its normal boiling point.

2. Apparatus for treating textiles and the like with a boiling liquid at a temperature below the normal boiling point of said liquid, comprising a closed tank for said textiles and liquid, a condensing chamber laterally disposed of said tank and a passageway connecting said tank and said condensing chamber for the passage of vaporized fluid from said tank to said condensing chamber, means for returning condensed liquid from said chamber to said tank, means for passing a cooling fluid in heat exchange with said condensing chamber, means for supplying heat to said tank, and first and second thermostatic means in said tank each being responsive to a predetermined temperature below the normal boiling point of said liquid, said first and second thermostatic means being positioned out of the path of the returning condensed liquid, said first thermostatic means being operatively connected to said means for passing cooling fluid and said second thermostatic means being operatively connected to said means supplying heat to said tank, so as to operate said means for passing cooling fluid and said means for supplying heat to condense enough vapors in said condensing chamber and to restrict the amount of heat supplied to said tank, whereby to maintain a predetermined partial vacuum in said tank and to boil said liquid in said tank at said predetermined temperature below its normal boiling point.

3. Apparatus for treating textiles and the like with a boiling liquid at a temperature below the normal boiling point of said liquid, comprising a closed tank for said textiles and liquid, a condensing chamber adjacent to and in communication with said tank for receiving vaporized fluid therefrom, means for returning condensed liquid from said chamber to said tank, a cooling fluid coil in heat exchange with said condensing chamber, a valve for regulating the passage of cooling fluid through said coil, a pipe connected to said tank, a valve for regulating the passage of heating fluid through said pipe, and first and second thermostatic means in said tank each being responsive to a predetermined temperature below the normal boiling point of said liquid, said first and second thermostatic means being positioned out of the path of the returning condensed liquid, said first thermostatic means being operatively connected to said first-named valve and said second thermostatic means being operatively connected to said second-named valve, so as to regulate the cooling fluid flowing through said coil and the heating fluid flowing through said pipe to condense enough vapors in said condensing chamber and to restrict the amount of heat supplied to said tank, whereby to maintain a predetermined partial vacuum in said tank and to boil said liquid in said tank at said predetermined temperature below its normal boiling point.

4. Apparatus for treating textiles and the like with a boiling liquid at a temperature below the normal boiling point of said liquid, comprising a closed tank for said textiles and liquid, a condensing chamber laterally disposed of said tank and a passageway connecting said tank and said condensing chamber for the passage of vaporized fluid from said tank to said condensing chamber, means for returning condensed liquid from said chamber to said tank, a cooling fluid coil in heat exchange with said condensing chamber, a valve for regulating the passage of cooling fluid through said coil, a pipe connected to said tank, a valve for regulating the passage of heating fluid through said pipe, and first and second thermostatic means in said tank each being responsive to a predetermined temperature below the normal boiling point of said liquid, said first and second thermostatic means being positioned out of the path of the returning condensed liquid, said first thermostatic means being operatively connected to said first-named valve and said second thermostatic means being operatively connected to said second-named valve, so as to regulate the cooling fluid flowing through said coil and the heating fluid flowing through said pipe to condense enough vapors in said condensing chamber and to restrict the amount of heat supplied to said tank, whereby to maintain a predetermined partial vacuum in said tank and to boil said liquid in said tank at said predetermined temperature below its normal boiling point.

PAUL E. WHITTINGTON.

REFERENCES CITED

The following references are of record in the file of this patent:

UNITED STATES PATENTS

| Number | Name | Date |
|---|---|---|
| 1,147,808 | Minton | July 27, 1915 |
| 1,400,675 | Grundy | Dec. 20, 1921 |
| 1,492,949 | Allison | May 6, 1924 |
| 1,572,975 | Van Meter | Feb. 16, 1926 |
| 1,633,759 | Breese | June 28, 1927 |
| 1,637,376 | Gibney | Aug. 2, 1927 |
| 1,776,190 | Mishaw | Sept. 16, 1930 |
| 1,802,034 | Perks | Apr. 21, 1931 |
| 1,816,033 | Wilsey | July 28, 1931 |
| 1,819,618 | Munters | Aug. 18, 1931 |
| 1,995,927 | Kirby | Mar. 26, 1935 |
| 2,022,809 | Kramer | Dec. 3, 1935 |
| 2,079,650 | Beeman | May 11, 1937 |
| 2,086,808 | Kallam | July 13, 1937 |
| 2,140,623 | Hetzer | Dec. 20, 1938 |
| 2,147,306 | McCulloch | Feb. 14, 1939 |
| 2,161,208 | Soderholm | June 6, 1939 |
| 2,223,362 | Federman | Dec. 3, 1940 |
| 2,243,093 | Flahive | May 27, 1941 |
| 2,311,180 | Bogart | Feb. 16, 1943 |